United States Patent [19]

Urwin et al.

[11] Patent Number: 5,308,458

[45] Date of Patent: *May 3, 1994

[54] DESTRUCTION PROCESS

[75] Inventors: Donald Urwin, Middlebrough; Andrew T. Sayer, Stockton On Tees; Colin Howarth, Newcastle Upon Tyne; Craig Wallis, Birmingham, all of England

[73] Assignee: Tioxide Group Services Limited, London, England

[*] Notice: The portion of the term of this patent subsequent to Nov. 17, 2009 has been disclaimed.

[21] Appl. No.: 826,466

[22] Filed: Jan. 27, 1992

[30] Foreign Application Priority Data

Feb. 9, 1991 [GB] United Kingdom ............... 9102766

[51] Int. Cl.$^5$ .............................................. C07B 63/00
[52] U.S. Cl. ........................... 204/157.6; 204/158.20; 204/158.21; 588/205; 588/210; 588/227; 588/248
[58] Field of Search ........... 204/157.4, 157.45, 157.46, 204/157.47, 157.48, 157.49, 157.50, 157.52, 157.6, 158.20.158.21; 588/205, 210, 227, 248

[56] References Cited

U.S. PATENT DOCUMENTS

| 4,303,486 | 12/1981 | Bard et al. | 204/162 R |
|---|---|---|---|
| 4,806,514 | 2/1989 | Langford et al. | 502/159 |
| 5,045,288 | 9/1991 | Raupp et al. | 422/186.3 |
| 5,163,626 | 11/1992 | Urwin et al. | 241/1 |

FOREIGN PATENT DOCUMENTS

| 76028/87 | 1/1988 | Australia . |
|---|---|---|
| 002568 | 6/1979 | European Pat. Off. . |
| 020055 | 12/1980 | European Pat. Off. . |
| 053881 | 6/1982 | European Pat. Off. . |
| 0056001 | 7/1982 | European Pat. Off. . |
| 078118 | 5/1983 | European Pat. Off. . |
| 080311 | 6/1983 | European Pat. Off. . |
| 0306301 | 3/1989 | European Pat. Off. . |
| 2450612 | 10/1980 | France . |
| 89/00985 | 9/1989 | PCT Int'l Appl. . |
| 328410 | 1/1930 | United Kingdom . |
| 1439235 | 6/1976 | United Kingdom . |

OTHER PUBLICATIONS

Australian Journal of Chemistry, "Carbon Dioxide . . . Of Solute Concentrations," vol. 40, No. 4, 1987.
Environmental Science and Technology, "Contaminant Degradation in Water," vol. 19, No. 6, 1985.
Chen-Yung Hsiao et al., "Heterogeneous Photocatalysis: Degradation of Dilute . . . ," Journal of Catalysis, pp. 418-423, (Feb. 4, 1983).
Ollis, "Contaminant Degradation in Water," Environ, Sci. Technol., pp. 480-484, (1985).
Serponse et al., "Potocatalysis Over TiO$_2$ Supported on a Glass Substrate," Solar Energy Materials, pp. 121-127, (May 19, 1986).
Matthews, "Photooxidation of Organic Impurities . . . ," J. Phys. Chem., pp. 3328-3333, (1987).
Matthews, "Carbon Dioxide Formation from Organic Solutes . . . ," Aust. J. Chem., pp. 667-675, (1987).
Al-Ekabi et al., "Kinetic Studies in Heterogeneous Photocatalysis . . . ," J. Phys. Chem., pp. 5726-5731, (Apr. 25, 1988).
Tanguay et al., "Dichloromethane Photodegradation Using Titanium Catalysts," Journal of Catalysis, pp. 335-347, (Jan. 17, 1989).
Matthews, "Purification of Water With Near-U.V. Illuminated . . . ," Wat. Res. vol. 24, pp. 653-660, (1990).

Primary Examiner—John Niebling
Assistant Examiner—C. Delacroix-Muirheid
Attorney, Agent, or Firm—Baker & Botts

[57] ABSTRACT

A process for the decomposition of photocatically degradable organic material includes exposing the organic material to ultraviolet light as the material is passing across the surface of a spinning disc. The surface of the disc carries anatase titanium dioxide adhering to the disc. The anatase titanium dioxide acts as a catalyst in the degradation process and preferably has a high surface area.

Organic materials such as hydrocarbons alcohols, acids, esters and others are destroyed by this environmentally acceptable process.

13 Claims, 1 Drawing Sheet

DESTRUCTION PROCESS

This invention relates to a destruction process and particularly to a process for the decomposition of organic material by ultraviolet light.

According to the present invention a process for the decomposition of photocatalytically degradable organic material comprises exposing said organic material in fluid form to ultraviolet light and passing said organic material across the surface of a plate-like member rotating about a central axis perpendicular to the radial plane of said member thereby accelerating said organic material radially outwardly of said axis across said surface of said member which carries anatase titanium dioxide adhering to said surface.

Generally speaking this invention makes use of a so-called "spinning disc reactor". This type of reactor includes within a reaction chamber a plate-like member or an assembly of a plurality of such members which is rotated about its central axis, usually a vertical axis, but a horizontal axis, or any other orientation is not excluded, to effect transfer of a liquid material from the central axis radially across the plate or plates to agitate and disturb said liquid material. Usually the liquid will be transferred either horizontally or vertically depending on the orientation of the plate. This type of reactor has now been found to be of value in promoting the degradation of photodegradable organic materials since it is designed to maximise turbulence within a very thin liquid film. This high degree of turbulence facilitates the mass transfer of oxygen, organic entitites, reaction products and intermediates, and other reactive species across the catalyst/liquid, and liquid/gas, interfaces within the system. Most other devices incorporating an immobilised $TiO_2$ suffer from mass transfer limitations.

The plate-like member usually has the form of a disc and the surface which is to contact the organic material can be provided with protrusions, indentations or can be corrugated, porous or perforated. As the plate-like member is rotated liquid flows from the central axis radially outwardly across the surface of the member and is accelerated and agitated.

Usually the organic material to be treated in the process of the invention is introduced in the form of a fluid into the reactor at the centre of the plate-like member and conveniently is introduced along the axis through a support for the member which also provides the rotational drive to the plate-like member from a suitably located electric motor or other rotational drive unit, e.g. a hydraulic motor.

The plate-like member can be formed from any material which is sufficiently strong to withstand the stress generated in the material during use. Preferably the material is substantially resistant to attack by any compound with which it is brought into contact during use. Typically the plate-like member is formed of glass, ceramic or preferably a metal such as stainless steel, nickel or titanium but other materials such as wood, porous plastic and paper can be used. A borosilicate glass plate-like member has been found to be useful when the member is formed of glass.

Typically the plate-like member when in the form of a disc has a diameter of from 25 cm to 5 meters. The member can have a thickness of from 0.05 mm to 50 mm, preferably from 0.25 mm to 5 mm, especially from 0.5 mm to 2.5 mm.

If desired the plate can have a series of concentric grooves on the upper surface to be contacted with the liquid. V-shaped grooves presenting a continuously decreasing gradient to the liquid as it travels across the surface of the plate-like member increase the retention of the liquid on the surface at higher rotational speeds of the member.

Generally speaking the speed of rotation of the plate-like member is in the range 50 rpm to 10,000 rpm and preferably in the range 100 rpm to 5000 rpm. The speed of rotation affects the acceleration of the liquid across the surface of the plate-like member.

The speed of rotation and the rate of flow of liquid onto the surface of the plate-like member are such that a thin film of the liquid is formed on the rotating surface of the member and this thin film is subjected during rotation to a high degree of turbulence as it is thrown radially outwardly of the member.

Normally the plate-like member is mounted with its surface either vertical or horizontal and it is the upper surface across which the liquid is caused to flow during exposure to ultraviolet light.

The surface of the member in contact with the liquid carries a photoactive catalyst which promotes the degradation of the organic material. In the process of the present invention the catalyst is anatase titanium dioxide, typically that produced by the hydrolysis of a soluble titanium compound such as titanyl sulphate or titanium tetrachloride and which after precipitation is calcined to produce the anatase titanium dioxide. Preferably the calcination conditions are chosen so that the time and/or temperature is somewhat less than that which would be required to produce optimum pigmentary anatase titanium dioxide. The catalyst preferably has a high surface area of from 20 to 200 $m^2/gm$. Typically a hydrated precipitate of titanium dioxide is calcined at a temperature of from 100° C. to 1000° C. for 10 minutes to 1000 minutes. Usually the anatase titanium dioxide has a particle size of from 0.001 micron to 1.0 micron.

If desired the anatase titanium dioxide can be produced by the oxidation of a titanium halide such as titanium tetrachloride under conditions such that the product has the desired high surface area.

The plate-like member carries the active catalyst at least on the surface to be in direct contact with the liquid to be treated and, as a result of the method of preparation, usually both radial surfaces of the member are coated with the chosen catalyst. One suitable procedure employed to coat the member with the catalyst is to immerse the member in an aqueous dispersion of the anatase titanium dioxide for a period of say 3 to 10 minutes and then dry the treated plate member in an oven for a period of say 30 to 75 minutes at a temperature of 70° C. to 100° C. This treatment procedure is repeated until a desired effective amount of the catalyst has been applied to the surface of the member. Using an aqueous dispersion containing from 5 to 15 gram per liter $TiO_2$ a total of from 7 to 15 immersion/drying cycles produces an "active" member.

Other procedures can include immersion in solutions of organic titanium compounds, with precipitation of $TiO_2$ by sol/gel techniques, and pyrolysis of titanium compounds directly onto the surface of the member. Additionally other support materials can be coated with $TiO_2$ and then attached to the surface of the member.

The organic material to be treated in the process of the invention is in the form of a fluid during treatment.

Where the organic material to be degraded is a liquid itself then it can be treated directly. However the organic can be dissolved or dispersed in water or in any other suitable medium prior to treatment. Aqueous solutions are preferred since the presence of water acts as a source for hydroxyl radicals and facilitates the transport of oxygen across the liquid/gas and solid/liquid interface. Typically the aqueous solution of the organic can have any pH value but preferably is acidic having a pH less than 7 and more preferably less than 4.

Activation of the anatase titanium dioxide catalyst is ensured by exposing the catalyst to the effect of ultraviolet light. The liquid to be treated is exposed to the light as it is in contact with the surface of the plate-like member and whilst ultraviolet light of any wavelength can be used it has been found that light emitted by so-called low pressure lamps is more effective in promoting degradation of the organic material. Typically UV light of up to 400 nanometers can be used but the most preferred light is that having a wavelength of from 240 to 280 nm.

The process can be operated batchwise or continuously. In batch operation liquid to be treated is held in a holding tank and recycled across the surface of the rotating plate member until all necessary degradation has been completed. Alternatively continuous operation can be effected if the required degradation is obtained by a single pass across the surface of the plate member or by a succession of passes across a number of different plate members. Usually suitable analytical means will be employed to test the extent of degradation prior to discharge of water to the environment.

Any organic compound which is capable of photodegradation can be treated by the method of the invention. Depending on the exact nature of the organic material various by-products can be obtained. For those organic compounds composed solely of carbon hydrogen and oxygen the process produces water and carbon dioxide as the degradation products. For organic materials containing halogen additionally dilute mineral acid is a degradation product. The process, in any event, produces relatively easily handleable chemicals from often complex organic compounds.

Usually the process of the invention is carried out at room temperature with the rotating plate mounted in a suitable confining reactor equipped with a suitable source of ultraviolet light.

Typical organic compounds which can be treated in accordance with the invention are aliphatic or aromatic hydrocarbons, alcohols, acids, esters, ketones, amines and halogen substituted compounds. Pesticides are other environmentally hazardous organic products eminently suitable for treatment by the process of the invention.

The invention is illustrated in the following Examples in which apparatus as shown in the accompanying drawing was used.

Figure 1:
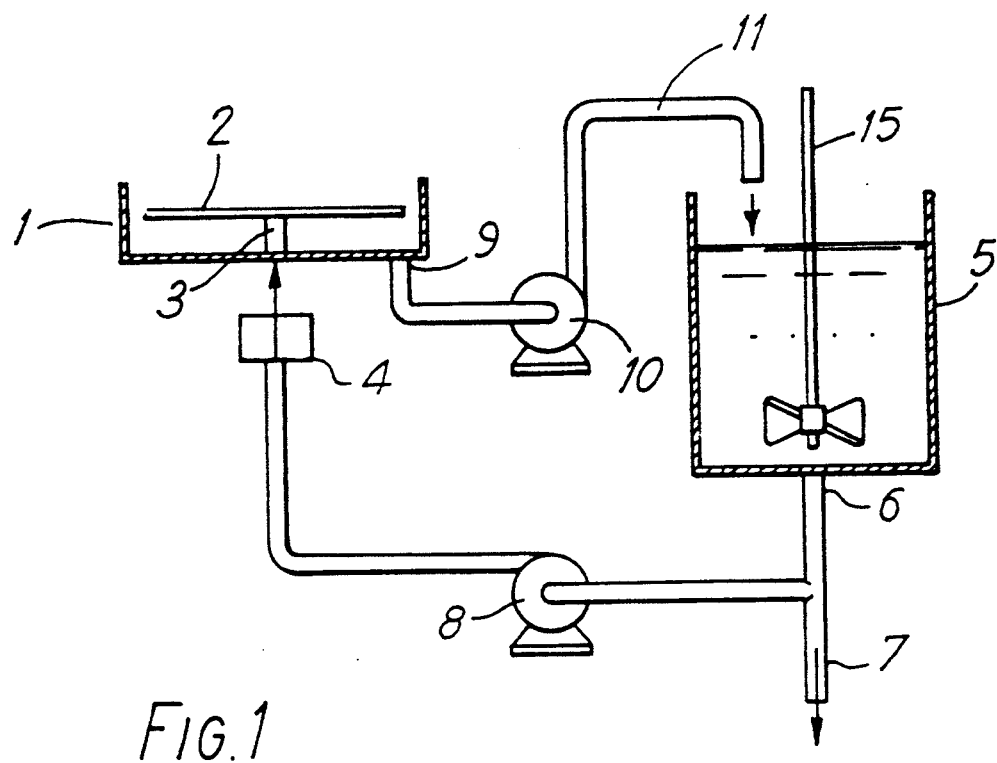
FIG. 1 is a diagrammatic representation of the overall layout.

As shown the apparatus includes a reactor chamber 1 having mounted horizontally therein a rotatable disc 2 on a hollow shaft 3 coupled to a motor 4. A storage tank 5 has an outlet 6 in the base of the tank 5 through which the contents of the tank can be drained through pipe 7. The outlet 6 is also coupled to a pump 8 to feed the contents of the tank 5 through the hollow shaft 3 to the upper surface of the disc 2. The base of the reactor chamber 1 has an outlet 9 to a pump 10 and a return pipe 11 to the tank 5.

Figure 2:
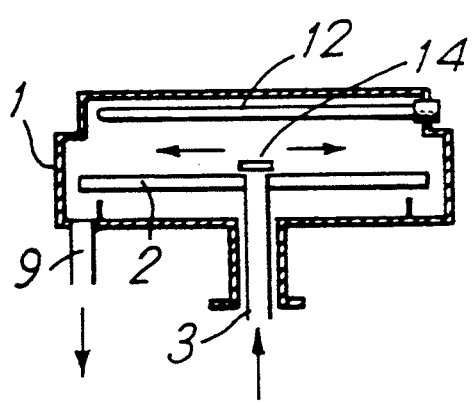
FIG. 2 is one form of reactor.

FIG. 2 illustrates one form of reactor chamber 1 in which there is horizontally mounted lamps 12 to produce ultraviolet light. The lamp 12 extends across a diameter of the disc 2.

Figure 3:
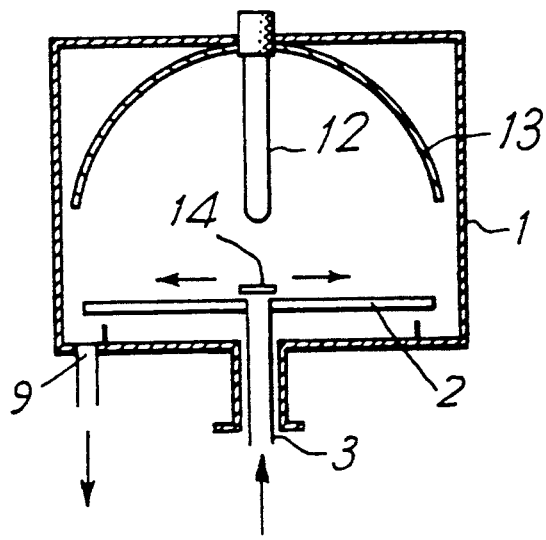
FIG. 3 is an alternative form of reactor.

In FIG. 3 an alternative arrangement of reactor chamber 1 is shown in which the lamp 12 is mounted vertically above but axially in line with the axis of the disc. A reflector 13 is positioned to direct the light onto the disc 2.

The reactor chamber 1 is equipped with an axial deflector plate 14 to deflect flow of liquid from the hollow shaft 3 onto the upper surface of the disc 2. The tank 5 is equipped with a stirrer 15.

As used the rotatable disc 2 was formed from borosilicate glass and had a diameter of 38 cm. The speed of rotation of the disc in the following experiments was 350 rpm and a liquid flow rate across the upper surface of the disc 2 was maintained at 180 liters per hour. The temperature within the reactor chamber 1 was maintained at about 25° C.

The rotatable disc 2 carried a coating of anatase titanium dioxide the particular form of which is described in the following examples. The disc was coated by preparing an aqueous slurry of the titanium dioxide containing 10 gpl by milling the anatase titanium dioxide with water in the required amount and the disc 2 was then immersed in the slurry for a period of 5 minutes. The disc was removed from the slurry and dried in an oven at 90° C. for one hour. This particular coating and drying procedure was repeated for a total of 10 cycles. The disc was then washed thoroughly after the last drying stage to remove any loose titanium dioxide particles from the surface.

EXAMPLE 1

A 38 cm disc of borosilicate glass was coated with a thin film of $TiO_2$ as described previously.

The disc was attached to the shaft 3 and run at 350 rpm. An aqueous solution containing 100 micromoles per liter of 4-chlorophenol was pumped over the disc at the rate of 180 l/hr whilst the disc was illuminated with UV light as shown in FIG. 2 from two 15 watt low-pressure lamps at different intensities. Solution pH was maintained at pH 3.1 with 2% $H_2SO_4$.

Rates of reaction calculated from experimental data were as follows:

|  | UV intensity $Wm^{-2}$ | Rate of Reaction ($K_R$) Micromoles/min/liter |
| --- | --- | --- |
| Experiment A | 14.0 | 0.563 |
| Experiment B | 27.9 | 0.652 |

$K_R$ is defined by reference to the Langmuir-Hinshelwood Kinetics.

EXAMPLE 2

Experimental conditions were similar to Example 1 except that the low pressure lamp was substituted by a 400 watt medium pressure lamp as in FIG. 3.

Results were as follows:

|  | UV intensity Wm$^{-2}$ | Rate of Reaction (K$_R$) Micromoles/min/liter |
| --- | --- | --- |
| Experiment A | 27.9 | 0.228 |
| Experiment B | 49.0 | 0.245 |
| Experiment C | 98.2 | 0.381 |
| Experiment D | 246.0 | 0.418 |

The above results demonstrate that the use of a low pressure lamp increases the speed of destruction of 4-chloro-phenol, compared with a medium pressure, higher output, lamp. This increase could not be accounted for in terms of a photochemical reaction.

EXAMPLE 3

Examples 1 and 2 were repeated with an initial concentration of 100 micromoles/liter of salicylic acid.

|  | UV Intensity Wm$^{-2}$ | Lamp | Rate of Reaction (K$_R$) Micromoles/min/liter |
| --- | --- | --- | --- |
| Experiment A | 27.9 | Low Pressure | 0.419 |
| Experiment B | 246.0 | Medium Pressure | 0.185 |

The rate of degradation of the salicylic acid is slower than for 4-chlorophenol, but, once again, the low pressure lamp is more effective than the medium pressure lamp.

EXAMPLE 4

Experimental conditions were similar to Experiment 1 using two 15 W low pressure lamps and an initial concentration of 100 micromoles per liter of 4-chlorophenol. Solution pH was controlled by addition of acid or alkali as required.

|  | Solution pH | Organic | Rate of Reaction Micromoles/min/liter |
| --- | --- | --- | --- |
| Experiment A | 3 | Chlorophenol | 0.418 |
| Experiment B | 5 | Chlorophenol | 0.257 |
| Experiment C | 11 | Chlorophenol | 0.121 |

We claim:

1. A process for the oxidative decomposition of photocatalytically degradable organic material comprising exposing said organic material in fluid form to ultraviolet light and passing said organic material across a surface of a plate-like member which carries anatase titanium dioxide adhering to said surface, said member rotating about a central axis perpendicular to the radial plane of said member thereby accelerating said organic material radially outward of said axis across said surface of said member creating a high degree of turbulence and a mass transfer of atmospheric oxygen across the liquid/gas phase interface on said surface.

2. A process according to claim 1 in which the anatase titanium dioxide has a surface area of from 20 to 200 m$^2$/gm.

3. A process according to claim 1 in which the anatase titanium dioxide has a particle size of from 0.001 to 1.0 micron.

4. A process according to claim 1 in which the ultraviolet light is that emitted by a low pressure lamp.

5. A process according to claim 1 in which the ultraviolet light has a wavelength of up to 400 nanometers.

6. A process according to claim 1 in which the plate-like member has the form of a disc having a diameter of from 25 cm to 5 meters.

7. A process according to claim 1 in which the plate-like member has a thickness of from 0.05 mm to 50 mm.

8. A process according to claim 1 in which the plate-like member is rotated at a speed of from 50 rpm to 10,000 rpm.

9. A process according to claim 8 in which the plate-like member is rotated at a speed of from 100 rpm to 5,000 rpm.

10. A process according to claim 1 in which the said organic material is a dispersion or a solution in water.

11. A process according to claim 10 in which the water dispersion or solution is acidic.

12. A process according to claim 11 in which the water dispersion or solution has a pH of less than 4.

13. A process according to claim 1 in which the said organic material is a hydrocarbon, an alcohol, an acid, an ester, a ketone, an amine or a halogen substituted compound.

* * * * *